US008004175B2

(12) United States Patent
Toda et al.

(10) Patent No.: US 8,004,175 B2
(45) Date of Patent: Aug. 23, 2011

(54) LIGHT-EMITTING MATERIAL, LIGHT-EMITTING BODY, AND LIGHT-EMITTING METHOD

(75) Inventors: Mikio Toda, Tokyo (JP); Toshiro Nishi, Nagasaki (JP); Nobuki Oka, Nagasaki (JP); Hiroyuki Tsutaya, Nagasaki (JP); Kuniaki Ara, Ibaraki (JP); Hiroaki Ohira, Ibaraki (JP); Kazuya Kurome, Hyogo (JP); Naoki Yoshioka, Tokyo (JP)

(73) Assignees: Mitsubishi Heavy Industries, Ltd., Tokyo (JP); Japan Nuclear Cycle Development Institute, Naka-gun (JP)

( * ) Notice: Subject to any disclaimer, the term of this patent is extended or adjusted under 35 U.S.C. 154(b) by 470 days.

(21) Appl. No.: 10/547,294

(22) PCT Filed: Jun. 16, 2005

(86) PCT No.: PCT/JP2005/011023
§ 371 (c)(1),
(2), (4) Date: Oct. 26, 2006

(87) PCT Pub. No.: WO2005/123875
PCT Pub. Date: Dec. 29, 2005

(65) Prior Publication Data
US 2007/0051931 A1   Mar. 8, 2007

(30) Foreign Application Priority Data

Jun. 16, 2004   (JP) ................... 2004-178901

(51) Int. Cl.
*C09K 11/08* (2006.01)
(52) U.S. Cl. ........ 313/503; 313/500; 313/501; 313/504; 313/505; 313/506; 252/700; 252/301.36; 252/301.4 R; 977/810

(58) Field of Classification Search .......... 313/495–512; 315/169.3, 169.4; 252/301.36, 301.4 R; 977/810; 257/17, 21, 98
See application file for complete search history.

(56) References Cited

U.S. PATENT DOCUMENTS 2,116,977 A * 5/1938 Laise ........................... 313/486
(Continued)

FOREIGN PATENT DOCUMENTS

EP   1 506 987 A1   2/2005
(Continued)

OTHER PUBLICATIONS

Hiroaki OhiRa et al., "Development of Functional liquid metal by dispersing Nano-particles" Japan Nuclear Cycle Development Institute, 4002 Narita, Oariri, Ibaraki. Sep. 5, 2003.*

(Continued)

*Primary Examiner* — Karabi Guharay
*Assistant Examiner* — Elmito Breval
(74) *Attorney, Agent, or Firm* — Oblon, Spivak, McClelland, Maier & Neustadt, L.L.P.

(57) ABSTRACT

A light-emitting material is provided allowing a light-emitting body having an excellent low-excitation characteristic and high brightness to be obtained by using a light-emitting material containing a light-emitting base material that emits light through radiative transition of electrons in material atoms, the light-emitting base having nanoparticles added thereto and dispersed therein, the light-emitting material also allowing a reduction in excitation energy and an increase in brightness to be simultaneously achieve, thereby allowing, for a wide range of light-emitting bodies, a reduction in excitation energy and a significant improvement in brightness to be achieved in a simple structure. Also provided is a light-emitting body having the light-emitting material and a light-emitting method.

22 Claims, 6 Drawing Sheets

U.S. PATENT DOCUMENTS

| | | | |
|---|---|---|---|
| 2,357,732 A * | 9/1944 | Ehrlich | 313/487 |
| 3,541,377 A * | 11/1970 | Nagy | 313/489 |
| 4,339,686 A | 7/1982 | Potter | |
| 4,893,057 A | 1/1990 | Tillman nee Caruso et al. | |
| 6,695,981 B2 * | 2/2004 | Igarashi et al. | 252/301.4 S |
| 6,777,706 B1 * | 8/2004 | Tessler et al. | 257/17 |
| 6,995,505 B2 * | 2/2006 | Kim et al. | 313/503 |
| 2002/0005090 A1 | 1/2002 | Armstrong et al. | |
| 2003/0218415 A1 * | 11/2003 | Matsuo | 313/485 |
| 2005/0073239 A1 * | 4/2005 | Srivastava et al. | 313/487 |
| 2005/0117318 A1 * | 6/2005 | Tenmyo | 362/16 |

FOREIGN PATENT DOCUMENTS

| | | |
|---|---|---|
| JP | 9-148071 | 6/1997 |
| JP | 2000-104058 | 4/2000 |
| JP | 2001-520937 | 11/2001 |
| JP | 2003-215252 | 7/2003 |
| JP | 2004-339461 | 12/2004 |
| JP | 2005-239775 | 9/2005 |

OTHER PUBLICATIONS

Hiroaki Ohira et al., "Investigation of Functional Liquid metal with Dispersing Nano-particles" Japann Nuclear Cycle Development Institute; Sep. 2003.*

Supplementary European Search Report dated Apr. 14, 2011 in European Patent Application No. 05 75 1522.

H. Ohira et al., Nano Ryushi o Bunsan Saseta Kinosei Ekitai Kinzoku ni Kansuru Kenkyu/Investigation of Functional Liquid Metal with Dispersing Nano-particles, Sep. 1, 2003, XP-0029969627, 72 pages.

* cited by examiner

LIGHT-EMISSION BRIGHTNESS OF Na D-LINE

LIGHT-EMITTING MATERIAL, LIGHT-EMITTING BODY, AND LIGHT-EMITTING METHOD

TECHNICAL FIELD

The present invention relates to a light-emitting material suitable for use in a light-emitting body used for illumination or the like, a light-emitting body using the light-emitting material, and a light-emitting method. In more detail, the present invention relates to a light-emitting material that requires less excitation energy for light emission and has an extremely high light-emitting brightness with respect to the excitation energy, and a low-excitation, high-brightness light-emitting body using the light-emitting material.

BACKGROUND ART

Illumination is a technology particularly important to human beings. Starting with the use of lamps (light-emitting bodies) using trees or grease, many light-emitting body technologies have been developed until today. Today's wide-ranging light-emitting technologies have allowed implementation of, for example, incandescent lamps, fluorescent lamps, mercury lamps, and sodium lamps that are mainly used for general illumination; neon tubes frequently used for various displays; plasma displays; various laser light-emitting bodies; and light-emitting diodes.

In the light-emitting body technologies, both new and old, the following two main points are always required for a light-emitting body: (1) the energy required for light emission is as low as possible, in other words, the light-emitting body has a low-excitation characteristic, and (2) the brightness with respect to a certain excitation energy is as high as possible. With the advance of the light-emitting body technologies, the excitation energy has been reduced and the brightness has been increased. In reality, however, further reduction in excitation energy and increase in brightness are demanded. These are also urgent demands in consideration of, for example, the recent adverse effects on the environment caused by the use of fossil energy and the problem of exhaustion of fossil fuels in the near future.

In response to the demands for improving a low-excitation characteristic and increasing brightness, various efforts have conventionally been done. For example, as an example of efforts to improve the low-excitation characteristic, a technology is suggested using a nanocrystal fluorescent substance in order to improve a light-emitting efficiency of a fluorescent substance (Patent Document 1). This nanocrystal fluorescent substance is obtained by, for example, reacting manganese acetate and zinc acetate with sodium sulfide in a solvent. In this case, a zinc-sulfide nanocrystal fluorescent substance doped with manganese is obtained.

Patent Document 1: Japanese Patent Application Laid-Open Publication No. 2000-104058

DISCLOSURE OF INVENTION

Problem to be Solved by the Invention

However, in the technology disclosed in Patent Document 1 mentioned above, a fluorescent-substance microcrystalline has to be prepared through chemical reaction, thereby posing a problem of making manufacturing steps complex. Moreover, the light-emission efficiency is improved only within an extremely limited range of the fluorescent substance as a light-emitting body, and an improvement in low-excitation characteristic and an increase in brightness in a wide range of light-emitting bodies are not achieved.

The present invention is devised in view of the situations described above, and a problem of the present invention is to provide a light-emitting material capable of reducing excitation energy of a wide range of light-emitting substances and achieving a significant improvement in brightness with a simplified structure, and a light-emitting substance having the light-emitting material.

Means for Solving Problem

To solve the above problem, upon diligently performing repeated experiments and studies, the inventors have obtained the following findings.

That is, light-emitting bodies based on light-emitting principles mainly include: those using light emission of a substance at a high-temperature state, as in an incandescent lamp or halogen lamp; those using light emission by producing radiative transition of electrons of a light-emitting substance through excitation by, for example, discharge from a mercury lamp, xenon lamp, sodium lamp, fluorescent lamp, or the like; and those using an electroluminescence phenomenon in which electric energy in a light-emitting diode or the like is directly converted to light. Of these, the light-emitting body based on the light-emitting technology for light emission by heating has a low energy efficiency, and therefore cannot be mainstream in the future illumination. The remaining light-emitting bodies, the one for light emission by producing, by exciting means such as electric discharge, radiative transition of electrons of a light-emitting substance and the other for light emission by using an electroluminescence phenomenon, are expected to be potential candidates as future light-emitting bodies. Of these, the former light-emitting body using radiative transition of electrons is manufactured in an easier method at lower cost. With this light-emitting body using radiative transition of electrons being set as a main target, the inventors aimed at establishing a technology for improving a low-excitation characteristic and increasing brightness. An illumination lamp using radiative transition of electrons of a light-emitting substance through electric discharge and having the simplest structure is a sodium lamp. Firstly, experiments and studies were repeatedly performed so as to improve a low-excitation characteristic and increase brightness of this sodium lamp. As a result of various trial-and-error experiences through the experiments, various phenomena were able to be observed as follows.

For a study by taking a sodium lamp as a model structure in a very simplified form, sodium, which is a light-emitting material, is input into a crucible under inert gas atmosphere, and the crucible is kept at approximately 350° C. to liquefy the sodium. In this state, a sufficient amount of excitation energy is not applied to the sodium. Therefore, emission light (D-line emission light) through radiative transition of electrons cannot be observed not only by the naked eye but also by a photodetector even if the environment is made dark. In such D-line emission light at an extremely low level, the brightness cannot be increased to a visible level until high energy from a wavelength-variable laser or the like is applied to the sodium for excitation. In theory, however, it can be said that, even in such a state, D-line emission light has occurred at an extremely low level. Thus, in such liquid sodium, a predetermined amount (10 ppm to 100 ppm) of nickel ultrafine particles (in the experiment, ultrafine particles having a particle size of 10 nanometers to 40 nanometers were used), which are nanoparticles, were uniformly dispersed. With the nanoparticles being uniformly dispersed, when the environment was made dark and observed by the naked eye, flame-like emission light was observed on the surface of the sodium in the crucible. This phenomenon signifies that only by dispersing a small amount of nanoparticles in sodium, which is a light-emitting material, the brightness of its D-line emission light can be significantly increased to a visible level. D-line emission light (light having a wavelength of 589.6 nanometers) is, in other words, illumination light of a sodium lamp. The phenomenon was further tested by variously adjusting the conditions, and sufficient reproducibility and reliability have been confirmed.

The mechanism of the phenomenon in which the brightness of sodium D-line emission light in a low-excitation state is increased by adding nanoparticles has not yet been fully elucidated by now, but its reproducibility and reliability have been confirmed. Here, it seems that the type of substance of nanoparticles is not a major factor, but the size thereof is an important factor.

As constituents of the nanoparticles, at least one type selected from metals and nonmetals is used. Examples of the metals include single-element metals, such as copper (Cu), nickel (Ni), titanium (Ti), and cobalt (Co); their metallic compounds, such as oxides, nitrides, and suicides; and alloys, such as stainless steel, chromium molybdenum steel, and the like. Further, examples of the nonmetals include silicon, carbon, and the like. Nanoparticles can be obtained by crushing the metal or nonmetal into particles with a particle diameter is not larger than 1,000 nanometers, preferably 1 nanometer to 500 nanometers, more preferably 1 nanometer to 100 nanometers, thereby nanoparticles are obtained. In addition, there are materials currently commercially available as nanopowder. For example, "nickel fine powder" "copper fine powder" and "cobalt fine powder" produced by Sumitomo Electric Industries, Ltd., "nickel metal nanopowder", "copper metal nanopowder", and "cobalt metal nanopowder" produced by Japan Nanotech Co., Ltd., and the like are available.

To increase reliability of the effect of increasing the brightness of emission light, it turned out that the nanoparticles are required to be uniformly dispersed in a light-emitting-body base material. Also, to allow such uniform dispersion, it was found as an important factor that no oxide film is formed on the surface of the nanoparticles. If an oxide film is on the surface of the nanoparticles, affinity (lyophilic characteristic) with solid sodium, which is a base material, is low. Therefore, even if nanoparticles are mixed while liquid sodium is sufficiently agitated, the nanoparticles partially aggregate and are not uniformly dispersed. On the other hand, if an oxide film on the surface of the nanoparticles is removed or reduced to bring about a state where no oxide film is present, affinity with solid sodium, which is a base material, becomes improved. As a result, when nanoparticles are mixed while solid sodium is agitated, they are easily dispersed and uniformed.

Achievable methods for achieving the state in which no oxide film is present on the surface of the nanoparticles are first broadly classified into: (a) a method of removing an oxide film before mixing the nanoparticles with liquid sodium; (b) a method of removing an oxide film while mixing; and (c) a method of covering the surface of the particles with sodium atoms at the time of manufacturing nanoparticles, in other words, a method of covering the surface of nanoparticles with sodium atoms before an oxide film is formed on the surface thereof.

Specifically, the method (a) can be achieved by placing the nanoparticles having formed an oxide film under hydrogen gas atmosphere. Next, the method (b) can be achieved by mixing and agitating an oxygen getter before or after mixing nanoparticles in liquid sodium. The oxide film is reduced during an agitating process. The last method (c) can be achieved by a novel apparatus. That is, it is possible to use a production apparatus composed of at least an evaporation chamber in which sodium and a material of the nanoparticles are vaporized and mixed under inert gas atmosphere; a molecular-beam chamber connected to the evaporation chamber via a small hole, in which the vaporized mixture inside the evaporation chamber issued from the small hole is received under vacuum atmosphere and a nanoparticle/sodium complex in a form where sodium atoms are adsorbed on the surfaces of the nanoparticles in the vaporized mixture is separated from other atomic sodium and nanoparticles depending on mass differences; and a collection chamber connected to the molecular-beam chamber, in which the separated nanoparticle/sodium complex is collected under vacuum atmosphere. With the manufacturing apparatus, nanoparticles with their surface covered with sodium atoms without surface oxide film can be obtained.

A sodium lamp has a structure in which a glass tube (luminous tube) having enclosed therein argon gas as inert gas has further enclosed therein sodium, and with a voltage being applied to electrodes mounted at both ends of the luminous tube, electric discharge is caused in the luminous tube. Also, the structure is such that the luminous tube is further covered with a protective external tube, and the protective external tube is filled with nitrogen gas to prevent metal members of an electrode lamp from being deteriorated by oxidation. In this sodium lamp, sodium is excited by the electric discharge energy to cause radiative transition of electrons for light emission.

The light-emitting mechanism of sodium in the sodium lamp has a feature in which radiative transition of electrons are caused. Theoretically, the exciting means that causes radiative transition of electrons is not restricted to that using electric discharge, but can also be means for irradiation light with high intensity, such as wavelength-variable laser light as described above; application of an electric field, plasma generation, ionization through application of heat energy, and others. Furthermore, the light-emitting material is not restricted to sodium, and any substance is applicable as long as it is a substance having a characteristic of emitting light by radiative transition of electrons. For example, as known, mercury, various fluorescent substances, inert gas such as neon, or the like can be used as a light-emitting base material according to the present invention.

Also, the conventional sodium lamp has a structure in which electrodes and sodium are both enclosed, which poses a bottleneck in reduction of manufacturing cost. On the other hand, only sodium having contained therein nanoparticles is enclosed in a glass tube, and an electric-discharge phenomenon is caused in the glass tube by using high-frequency electric discharge. With this, a sodium lamp with high brightness can be configured so as to reduce manufacturing cost without the electrodes being enclosed in the glass tube.

The present invention has been devised based on the findings described above.

That is, a light-emitting material according to an embodiment of the present invention includes a light-emitting base material, and nanoparticles added thereto.

In a light-emitting material according to an embodiment of the present invention, the light-emitting base material consists of a substance that emits light through radiative transition of electrons in material atoms.

In a light-emitting material according to an embodiment of the present invention, the nanoparticles are uniformly dispersed in the light-emitting base material.

In a light-emitting material according to an embodiment of the present invention, the nanoparticles are dispersed in the base material as a result of the addition, thereby achieving a low-excitation and high-brightness light emission characteristic.

In a light-emitting material according to an embodiment of the present invention, light emission occurs through electric discharge.

In a light-emitting material according to an embodiment of the present invention, said electric discharge is arc discharge.

In a light-emitting material according to an embodiment of the present invention, the light-emitting base material is any one of sodium, mercury, and a fluorescent substance.

In a light-emitting material according to an embodiment of the present invention, the light-emitting base material is composed of at least two types or more of sodium, mercury, and a fluorescent substance.

In a light-emitting material according to an embodiment of the present invention, the electric discharge is glow discharge, and the light-emitting base material is inert gas.

In a light-emitting material according to an embodiment of the present invention, light emission occurs through any one of application of an electric field, plasma generation, ionization by heating, and light irradiation.

In a light-emitting material according to an embodiment of the present invention, the nanoparticles are of at least one type of ultrafine particles selected from a metal or a nonmetal.

In a light-emitting material according to an embodiment of the present invention, the nanoparticles have a particle size equal to or smaller than 1,000 nanometers in diameter.

Another embodiment of the present invention relates to a light-emitting body, and the light-emitting body includes a light-emitting material, wherein the material comprises a light-emitting base material, and nanoparticles added thereto.

In a light-emitting body according to an embodiment of the present invention, the light-emitting base material consists of a substance that emits light through radiative transition of electrons in material atoms.

In a light-emitting body according to an embodiment of the present invention, the nanoparticles are uniformly dispersed in the light-emitting base material.

In a light-emitting body according to an embodiment of the present invention, the nanoparticles are dispersed in the base material as a result of the addition, thereby achieving a low-excitation and high-brightness light emission characteristic.

In a light-emitting body according to an embodiment of the present invention, light emission occurs through electric discharge.

In a light-emitting body according to an embodiment of the present invention, the electric discharge is arc discharge.

In a light-emitting body according to an embodiment of the present invention, the light-emitting base material is any one of sodium, mercury, and a fluorescent substance.

In a light-emitting body according to an embodiment of the present invention, the light-emitting base material is composed of at least two types or more of sodium, mercury, and a fluorescent substance.

In a light-emitting body according to an embodiment of the present invention, the electric discharge is glow discharge, and the light-emitting base material is inert gas.

In a light-emitting body according to an embodiment of the present invention, light emission occurs through any one of application of an electric field, plasma generation, ionization by heating, and light irradiation.

In a light-emitting body according to an embodiment of the present invention, the nanoparticles are of at least one type of ultrafine particles selected from a metal or a nonmetal.

In a light-emitting body according to an embodiment of the present invention, the nanoparticles have a particle size equal to or smaller than 1,000 nanometers in diameter.

An embodiment of the present invention relates to a light-emitting method, and the light-emitting method includes the step of applying predetermined excitation energy to a light-emitting material, wherein the light-emitting material comprises a light-emitting base material, and nanoparticles added thereto.

In a light-emitting method according to an embodiment of the present invention, the light-emitting material uses a substance that emits light through radiative transition of electrons in material atoms as a light-emitting base material.

In a light-emitting method according to an embodiment of the present invention, the nanoparticles are uniformly dispersed in the light-emitting base material and are used as the light-emitting material, thereby achieving an increase in brightness of light emission.

In a light-emitting method according to an embodiment of the present invention, the nanoparticles are uniformly dispersed in the light-emitting base material and are used as the light-emitting material, thereby achieving a reduction in excitation energy required for light emission.

In a light-emitting method according to an embodiment of the present invention, electric discharge energy is used as the excitation energy.

In a light-emitting method according to an embodiment of the present invention, any one of sodium, mercury, and a fluorescent substance is used as the light-emitting base material.

In a light-emitting method according to an embodiment of the present invention, at least two types or more of sodium, mercury, and a fluorescent substance are used as the light-emitting base material.

In a light-emitting method according to an embodiment of the present invention, glow discharge energy is used as the electric discharge energy, and inert gas is used as the light-emitting base material.

In a light-emitting method according to an embodiment of the present invention, any one of electric-field energy, plasma, ionization by heating, and irradiated light is used as the excitation energy.

In a light-emitting method according to an embodiment of the present invention, at least one type of ultrafine particles selected from a metal or a nonmetal is used as the nanoparticles.

In a light-emitting method according to an embodiment of the present invention, the nanoparticles have a particle size equal to or smaller than 1,000 nanometers in diameter.

EFFECT OF THE INVENTION

The light-emitting material and the light-emitting body having the light-emitting material according to the present invention allow an improvement in low excitation characteristic and an increase in brightness to be achieved only by adding and dispersing a small amount of nanoparticles to a conventional light-emitting material Thus, energy consumption of a light-emitting body for use in various illuminations and displays can be significantly reduced. Furthermore, effects can be achieved including an increase in brightness, an extension in life, a reduction in size, and an increase in light emission response speed of the light-emitting body. Therefore, utilization of the present invention has profound effects on the industry.

DESCRIPTION OF REFERENCE NUMERALS 1 crucible
2 mantle heater
3 liquid sodium
4 stirrer device
4a stirrer propeller
5 thermocouple
6 aluminum wire (oxygen getter)
10 light-emission area
20 H-shaped electrical-discharge tube
21 siphon
22 vacuum pump
23 pressure gauge
24 supply tube
25 crucible
26 helium cylinder
27 flowmeter
28 thermoregulator
29 slidax
30 neon-sign transformer
31 spectroscope
32 oscilloscope
40 external tube made of glass
41 luminous tube
41a, 41b electrode
42 metal member
50 glass tube
51, 52 metal tube
53 high-frequency power supply
54 electric-discharge plasma
60 glass tube (discharge tube or fluorescent tube)
61a, 62a contact pin
61, 62 cap
63 electrodes
64 filament between the electrodes
65 fluorescent material

BEST MODE FOR CARRYING OUT THE INVENTION

Embodiments of the present invention are described in detail below based on the drawings. Note that the embodiments described below are merely illustrated for expediently describing the present invention, and do not restrict the present invention.

First Embodiment

Figure 1:
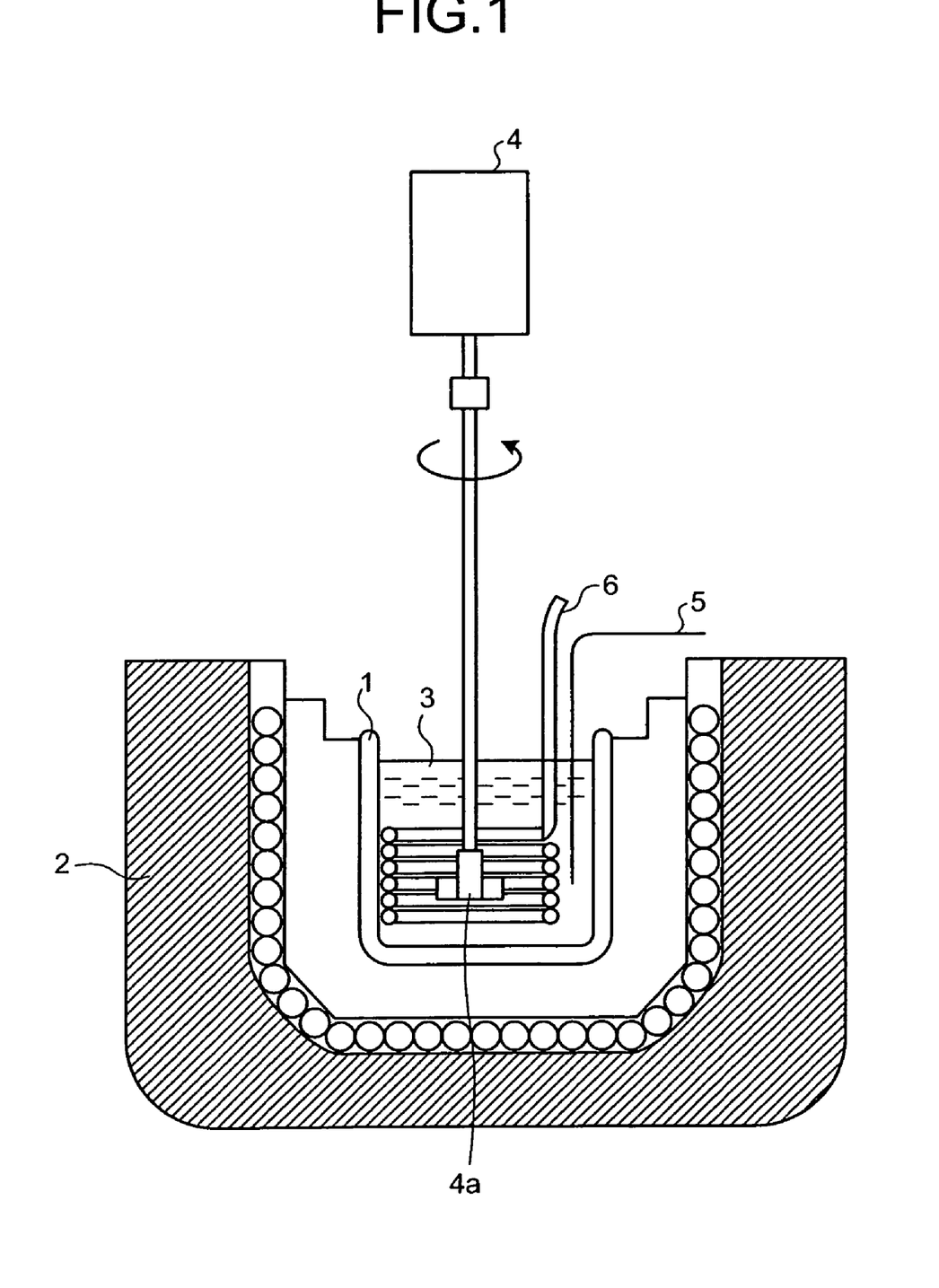
FIG. 1 is to describe a first embodiment of the present invention, and a schematic structural drawing of an apparatus that manufactures a nanoparticle-dispersed-sodium light-emitting material by reducing surface oxide film of nanoparticles and uniformly dispersing the nanoparticles to a liquid fluid.

In the present embodiment, an experiment example performed for confirming the structure and effect of the principles of the present invention is described with reference to FIG. 1.

In the drawing, a reference numeral 1 denotes a crucible made of ceramic and placed in a heating mantle 2, the crucible being filled therein with liquid sodium 3 at 250° C. to 350° C. under inert gas. In approximately the center of this crucible 1, a stirrer propeller 4a of a stirrer device 4 is inserted. Near the side wall, a thermocouple 5 for measuring temperature is inserted. Furthermore, inside the crucible 1, an aluminum wire 6 formed in a spiral along the inner wall is placed as an oxygen getter.

As nanoparticles, nickel ultrafine particles are used, for example. Normally, immediately after the manufacture of these nickel ultrafine particles, an oxide film is already formed thereon. Therefore, the particles are used on the precondition that surface oxide film is present. These nanoparticles are gradually added in the liquid sodium 3 in the crucible 1 until they form 20 mass percent to 30 mass percent of the entire amount of sodium. During this agitation, the stirrer propeller 4a is always rotated to sufficiently agitate the liquid sodium 3. Aluminum forming the aluminum wire 6 is lower in standard free energy of formation than sodium or nickel when forming an oxide, and therefore oxygen bonded to nickel is liberated from nickel, and is then bonded to aluminum. As a result, surface oxide film of nickel ultrafine particles is reduced, thereby bringing about a state in which no oxide film is present on the surface of the nickel ultrafine particles. The nickel ultrafine particles without having an oxide film on their surface have a high affinity for liquid sodium 3, and therefore they are easily dispersed and uniformly distributed in the liquid sodium 3. Such a state can be accurately confirmed by performing sampling using a sampling tube made of stainless steel not shown, and measuring the concentration of nickel ultrafine particles in the sample through atomic absorption spectrometry.

As such, an oxygen getter is previously input in a liquid light-emitting material, and the liquid light-emitting material is mixed with nanoparticles while being agitated, thereby removing surface oxide film of the nanoparticles and uniformly dispersing the nanoparticles. Thus, a nanoparticle-dispersed-sodium light-emitting material can be efficiently manufactured.

Figure 2:
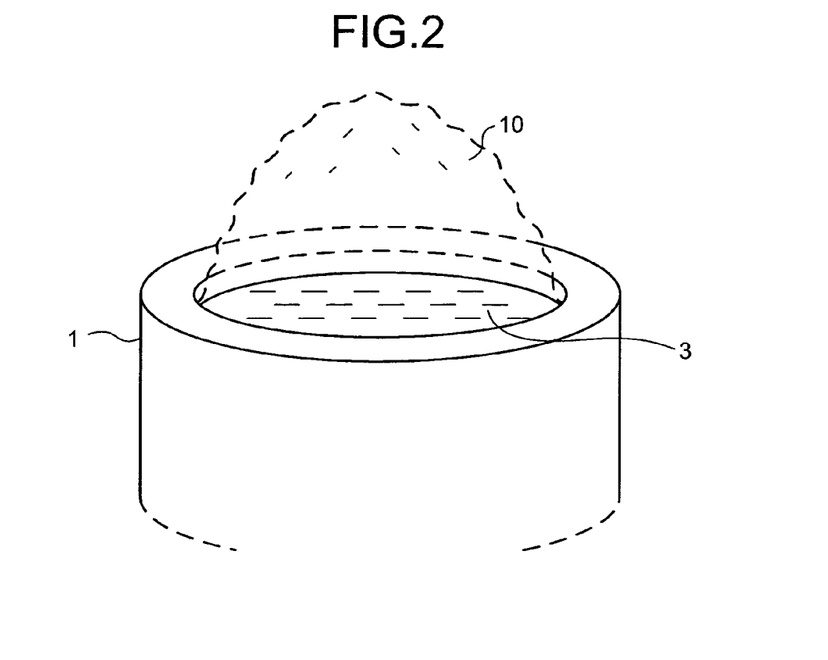
FIG. 2 is to describe the first embodiment of the present invention, and a perspective view of the state where the nanoparticle-dispersed-sodium light-emitting material in a crucible emits light under an environment where a sodium lamp is simulated.

As shown in FIG. 2, when the nanoparticle-dispersed-sodium light-emitting material (liquid sodium in the crucible 1) obtained in the manner described above was placed under dark environment, it was observed that the liquid sodium in the crucible 1 emitted light with a brightness to such a degree that it can be recognized by the naked eye. Liquid sodium without being mixed with nanoparticles does not have brightness to such a degree that it can be recognized by the naked eye. Therefore, for example, the brightness cannot be detected even by a photodetector unless a wavelength-variable laser apparatus is used for excitation for a sodium D-line emission light by laser light. However, only with nanoparticles being uniformly distributed, the brightness is increased to such a degree it can be recognized by the naked eye.

Figure 3:
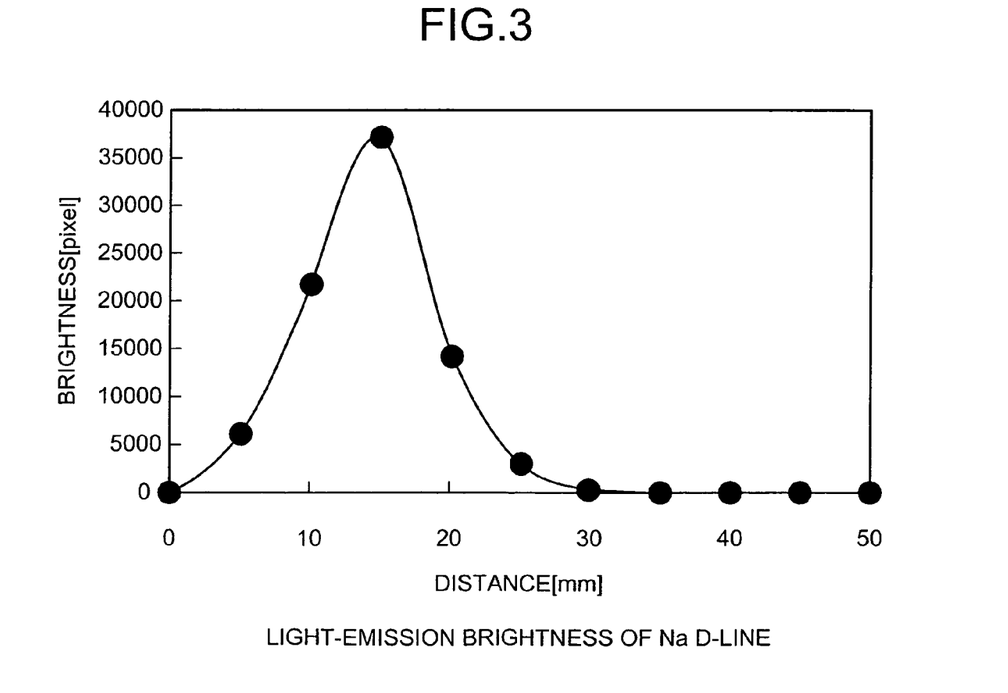
FIG. 3 is a drawing in graphical form which presents light-emission brightness found from images obtained by visualizing a light-emitting area shown in FIG. 2.

Next, the crucible 1 is placed under dark environment, and a flame-like light-emission area 10 from the nanoparticle-dispersed-sodium light-emitting material in the crucible 1 and its surrounding were visualized by a Charge-Coupled-Device (CCD) image pickup device. The brightness of pixels of visual images was analyzed and digitized, thereby making a graphical plot, with a distance from the center of the flame-like light-emission area being represented on a horizontal axis and a light-emission brightness being represented on a vertical axis. This graph is shown in FIG. 3. This graph represents a scale of the light-emission brightness by the number of pixels. If visualization is performed in a manner similar to the above with only the conventional liquid sodium which does not contain nanoparticles, brightness pixels are not caused, and therefore a graphical plot cannot be made. If the brightness pixels were displayed on this FIG. 3, the line would be overlapped with the base line of this graph. In the graph of FIG. 3, it can be observed that, in the nanoparticle-dispersed-sodium light-emitting material, an increase ratio of a relative brightness in the light-emission area is extremely high.

Second Embodiment

In the first embodiment described above, nickel ultrafine particles were used as nanoparticles to be added. In a second embodiment, titanium ultrafine particles were used as nanoparticles to be added. A nanoparticle-dispersed-sodium light-emitting material was manufactured in a manner similar to that in the first embodiment except for the use of titanium ultrafine particles.

The nanoparticle-dispersed-sodium light-emitting material was measured in a manner similar to that in the first embodiment by a CCD image pickup device under dark environment. Consequently, as with the first embodiment, light emission to a degree similar to that described above was observed.

Third Embodiment

In a third embodiment, silver ultrafine particles were used as nanoparticles to be added. A nanoparticle-dispersed-sodium light-emitting material was manufactured in a manner similar to that in the first embodiment except for the use of silver ultrafine particles.

The nanoparticle-dispersed-sodium light-emitting material was measured in a manner similar to that in the first embodiment by a CCD image pickup device under dark environment. Consequently, as with the first embodiment, light emission to a degree similar to that described above was observed.

Fourth Embodiment

In a fourth embodiment, stainless-steel ultrafine particles were used as nanoparticles to be added. A nanoparticle-dispersed-sodium light-emitting material was manufactured in a manner similar to that in the first embodiment except for the use of stainless-steel ultrafine particles.

The nanoparticle-dispersed-sodium light-emitting material was measured in a manner similar to that in the first embodiment by a CCD image pickup device under dark environment. Consequently, as with the first embodiment, light emission to a degree similar to that described above was observed.

The metal of nanoparticles used in the fourth embodiment is an alloy, that is, a metal formed of a plurality of atoms, which is different from a single-element metal, such as nickel used in the first embodiment, titanium used in the second embodiment, and silver used in the third embodiment. Also, chemical properties of the respective metals are different from each other. Despite such differences in the chemical structure and chemical property, by adding nanoparticles, the brightness of light emission is increased in a manner similar to that described above. Therefore, it can be assumed that the contribution of the nanoparticles in light emission of the nanoparticle-dispersed-sodium light-emitting material of the present invention is derived not from the property of the substance forming the nanoparticles, but from the degree of nanosize and dispersion.

Fifth Embodiment

In a fifth embodiment, to verify an increase in performance of a sodium lamp by nanoparticle dispersion in sodium, a luminous tube using an H-shaped discharge tube simulating a sodium lamp was created and caused to emit light. A schematic structure of an apparatus used for such light emission is shown in FIG. 4.

Figure 4:
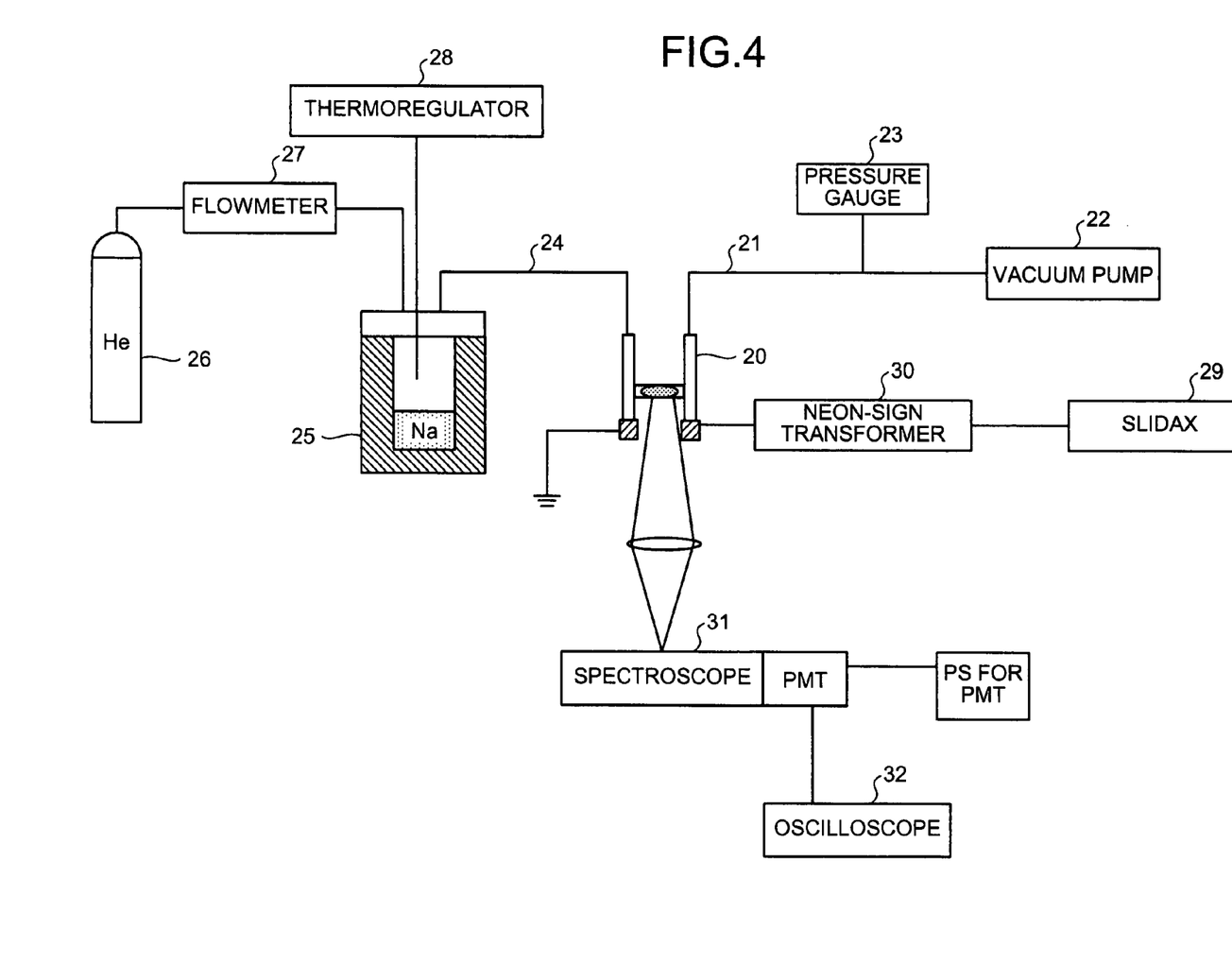
FIG. 4 is to describe a fifth embodiment of the present invention, and a schematic structural diagram of light emission and a light-emission intensity measuring apparatus using an H-shaped discharge tube simulating a sodium lamp.

In FIG. 4, a reference numeral 20 denotes an H-shaped discharge tube simulating a sodium lamp. The inside of this H-shaped discharge tube 20 is configured so as to be decompressed by a vacuum pump 22 connected thereto at one end via a siphon 21. The degree of vacuum can be detected by a pressure gauge 23 inserted in the siphon 21. Also, a supply tube 24 is connected to the other end of the H-shaped discharge tube 20, and the other end of the supply tube 24 is connected to the inside of a crucible 25. In the crucible 25, sodium alone or a nanoparticle-dispersed-sodium as required is input and then heated. The crucible 25 has connected thereto a helium cylinder 26 for supplying a certain amount of flow of helium gas adjusted by a flowmeter 27. Therefore, the sodium alone or the nanoparticle-dispersed-sodium heated by a thermoregulator 28 in the crucible 25 into a steam state is fed in the H-shaped discharge tube 20 with the helium gas serving as a carrier. After being filled with sodium alone or the nanoparticle-dispersed-sodium, the H-shaped discharge tube 20 is put into an electric discharge state by a neon-sign transformer 30 adjusted by a slidax 29, thereby causing light emission. The intensity of light emission at that time is measured by a spectroscope 31 and observed by an oscilloscope 32.

Titanium ultrafine particles were used as nanoparticles of nanoparticle-dispersed sodium. In the apparatus having the structure described above, a steam injection temperature of sodium alone or nanoparticle-dispersed sodium was controlled at 250° C. to 270° C., and an applied voltage of the discharge tube was set at 1200 V. On such conditions, light emission and light-emission intensity were measured.

As a result, (1) a light-emitting base material of the light-emission phenomenon was a sodium D-line; (2) the intensity of sodium light emission with dispersion of nanoparticles was increased by 10 percent to 20 percent; and (3) the intensity of sodium light emission with dispersion of nanoparticles was measured over a long period of time of one hour or longer from the start of light emission, and no reduction in intensity of light emission occurred until the end of measurement. Also, dispersion of titanium ultrafine particles, which are nanoparticles, were confirmed with a detection of a wavelength of a light emission line of titanium (336 nanometers) through measurement of light emission.

With such measurement results, it was confirmed that applying nanoparticle-dispersed sodium (light-emitting material) to a sodium lamp can achieve a light-emission amplification effect that is sustainable for a long time. The ratio of the light-emission amplification effect was as much as 20 percent. With 83 percent (1/1.2) of power consumption and the number of lamp bulbs of illumination using a conventional sodium lamp, the amplification effect can achieve an illumination performance equivalent to that in the conventional technology. The resultant economic effect will be significantly large.

Sixth Embodiment

Figure 5:
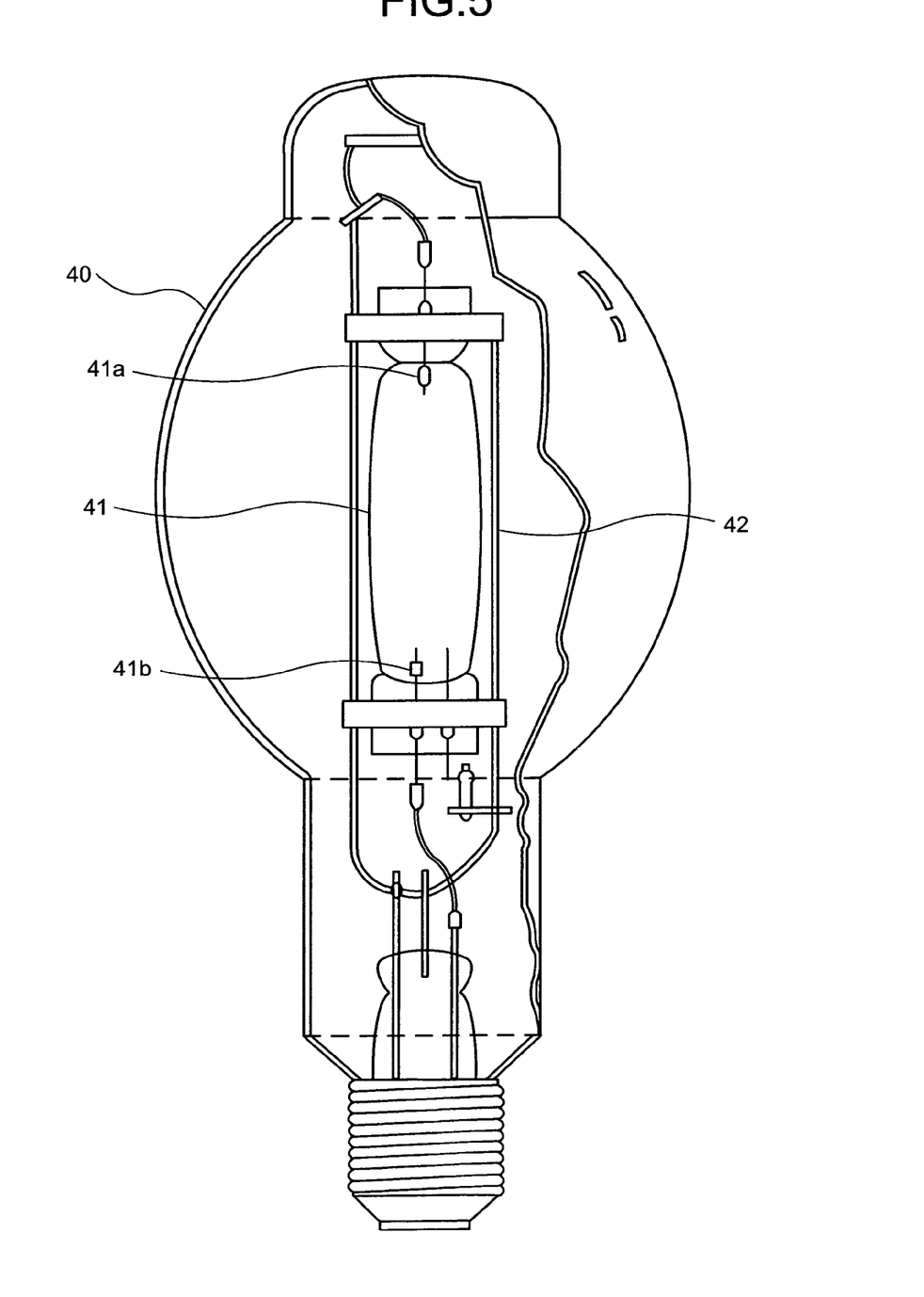
FIG. 5 is to describe a sixth embodiment of the present invention, and an internal structural drawing of a sodium lamp according to the present invention shown as being sectioned, the sodium lamp in which sodium with nanoparticles being dispersed is incorporated as a light-emitting material.

In a sixth embodiment, for example, the structure of a sodium lamp (light-emitting body) using nanoparticle-dispersed sodium obtained in the manner as described above as a light-emitting material is shown in FIG. 5.

An external tube 40 made of glass contains therein a luminous tube 41 made of translucent alumina ceramics and a metal member 42. On upper and lower ends of the luminous tube 41, electrodes 41a and 41b are placed, respectively, for generating an electric discharge. Inside this luminous tube 41, for example, nanoparticle-dispersed sodium and argon gas adjusted in the manner described in the first embodiment are enclosed as light-emitting materials. Nitrogen gas is enclosed between this luminous tube 41 and the external tube 40, thereby preventing oxidation of the metal member 42 due to an increase in temperature associated with light emission.

The sodium lamp having the structure described above and the conventional sodium lamp are different from each other only in the light-emitting material, that is, whether nanoparticle-dispersed sodium or sodium alone is used.

When the sodium lamp according to the present embodiment is used under the same applied-voltage condition as the conventional condition, a significant increase in brightness by approximately 20 percent can be expected. If a brightness equivalent to that in the conventional sodium lamp is sufficient, the applied voltage can be reduced. Also, if a brightness equivalent to that in the conventional sodium lamp is sufficient, further downsizing is possible. Furthermore, a brightness equivalent or higher to the conventional brightness can be achieved even if excitation energy (discharge power) is decreased, thereby allowing a reduction in illumination cost.

Seventh Embodiment

In the lamp structure shown in FIG. 5 described above, if mercury is enclosed in the luminous tube instead of sodium, a mercury lamp can be formed. In the case of the mercury lamp, a luminous tube made of quartz glass is sufficient, and therefore the luminous tube is made of quartz glass. Also in this mercury lamp, with a small amount of nanoparticles being dispersed in mercury, a brightness equivalent or higher to the conventional brightness can be achieved with low excitation.

Eighth Embodiment

Also, in the lamp structure of FIG. 5, if a metal-halogenated substance of sodium (Na), scandium (Sc), or the like other than mercury as a light-emitting base material is enclosed, a metal-halide lamp can be formed. Also in the metal-halide lamp, with a small amount of nanoparticles being dispersed in the light-emitting base material, a brightness equivalent or higher to the conventional brightness can be achieved with low excitation.

Ninth Embodiment

A ninth embodiment has a feature in which the electric-discharge power supply is changed to simplify the structure of the lamp, thereby achieving a reduction in lamp manufacturing cost.

The conventional sodium lamp has the structure in which both the electrodes and sodium are enclosed in the same glass tube. Placing the electrodes and enclosing sodium in the glass tube simultaneously makes the steps complex, thereby making it difficult to reduce manufacturing cost. To solve this problem, in the present embodiment, a high-frequency electric discharge is used for achieving a mechanism in which a plasma is caused in the glass tube without an electrode being placed in the glass tube, thereby simplifying the lamp structure.

Figure 6:
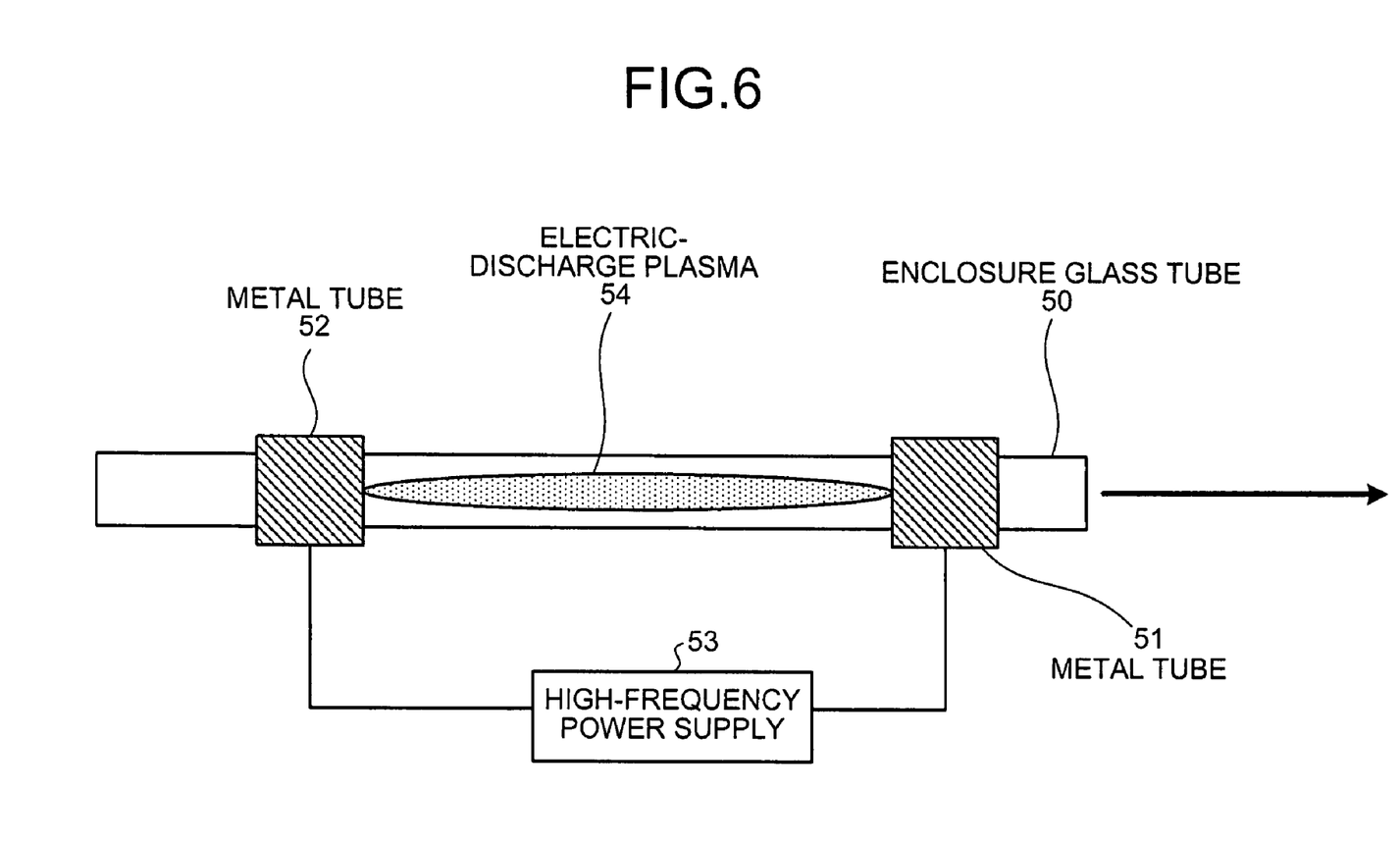
FIG. 6 is to describe a ninth embodiment of the present invention, and a schematic structural drawing of a sodium lamp with the structure of a lamp being simplified by changing a discharge power supply.

As shown in FIG. 6, a glass tube 50 in which nanoparticle-dispersed sodium is input is wrapped therearound by a pair of metal tubes 51 and 52. An electric discharge mechanism is adopted having the structure in which a high frequency is applied between these metal tubes 51 and 52 from a high-frequency power supply 53. With the application of the high-frequency, an electric-discharge plasma 54 occurs in the glass tube 50 between the metal tubes 51 and 52. With the occurrence of the plasma, sodium light emission occurs.

Although oxygen remaining as an impurity at the time of enclosure in the glass tube acts as a quencher to reduce the intensity of light emission, the effect of the nanoparticles (for example, titanium ultrafine particles) suppresses the reduction in intensity of light emission, thereby allowing stable light emission. Also, in the glass tube 50, the reaction of sodium and glass blackens the inner wall of the glass tube 50, thereby reducing the intensity of light emission. However, at a portion outside of the metal tubes 51 and 52, sodium and glass tend not to be reacted with each other, and thus the wall of the glass tube outside of the metal tubes 51 and 52 is little blackened. Therefore, if the configuration is such that light is extracted in a longitudinal direction of the glass tube 50 (in a direction indicated by an arrow in the drawing), a sodium lamp with an intensity of light emission being stable over time can be obtained.

The sodium lamp having the structure described above using nanoparticle-dispersed sodium as a light-emitting body is simple in structure and can be easily manufactured, thereby allowing a reduction in manufacturing cost. With nanoparticles being present in sodium, which is a light-emitting base material, impurity oxygen in the electric-discharge gas can be easily managed, thereby allowing a reduction in cost of manufacturing a sodium lamp.

In the present embodiment, a high-frequency power supply is adopted as an electric-discharge power supply. Alternatively, a structure allowing an electrodeless discharge not requiring an electrode being placed inside the discharge tube, for example, a combination of a microwave power supply and a microwave discharge tube, can achieve effects similar to those described above.

Tenth Embodiment

Figure 7:
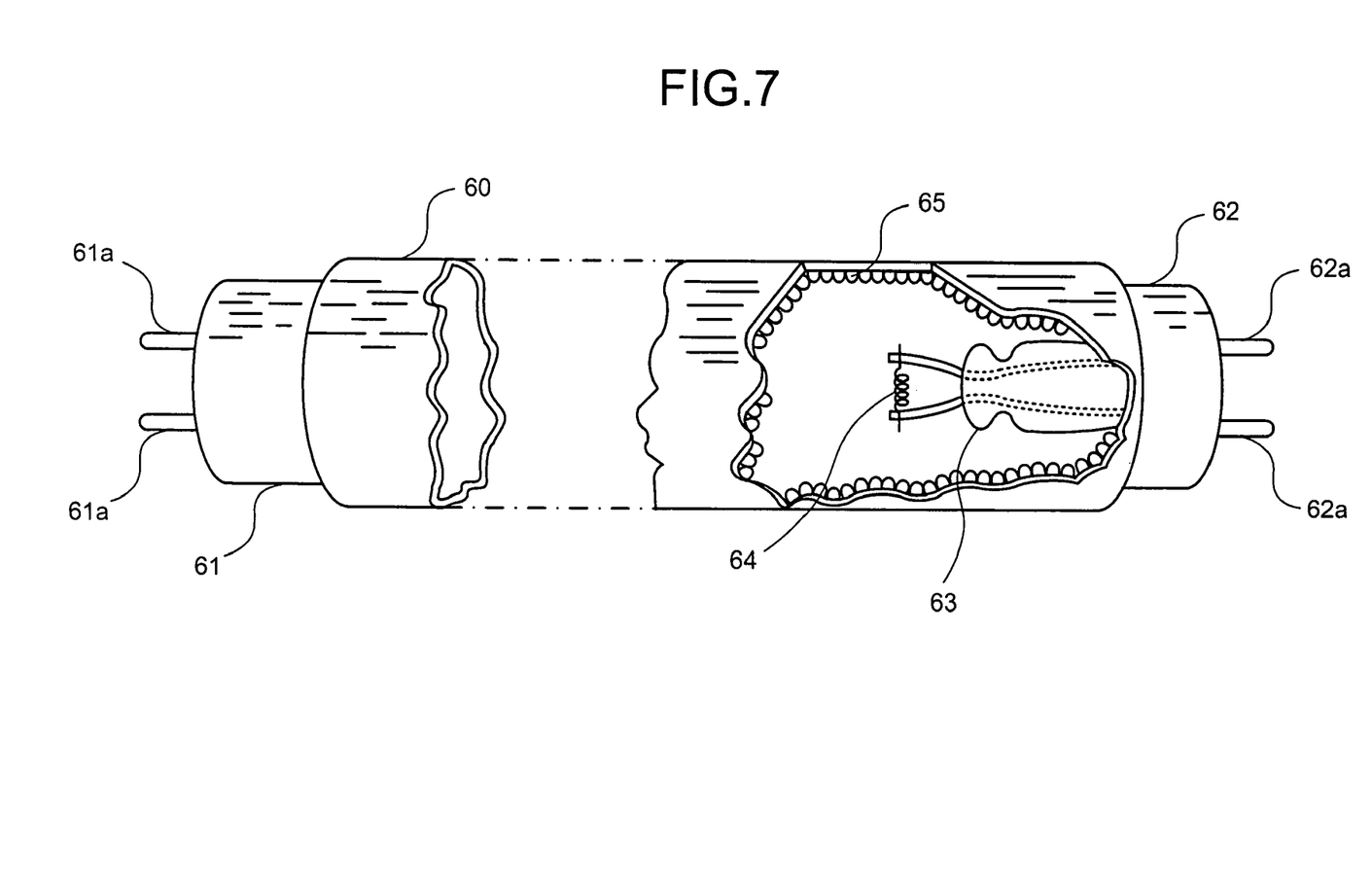
FIG. 7 is to describe a tenth embodiment of the present invention, and a structural drawing of a fluorescent lamp according to the present invention shown as being partially sectioned, the fluorescent lamp using a fluorescent material with nanoparticles being dispersed as a light-emitting material.

FIG. 7 is a side view of the fluorescent lamp (light-emitting body) according to the present invention shown as being partially sectioned. A glass tube (also referred to as a discharge tube or a fluorescent tube) 60 has both ends provided with a cap 61 having two contact pins 61a, 61a and a cap 62 having two contact pins 62a, 62a respectively. A filament 64 of electrodes 63 is coated with oxide, such as barium (Ba), strontium (Sr), or calcium (Ca), for activating electron radiative transition. Also, argon gas of several millimeters of mercury is enclosed in the tube, and the inner wall of the tube is applied with one or several types of a fluorescent material 65. In the fluorescent material 65, nanoparticles of 10 ppm to 100 ppm of the entire fluorescent material are dispersed.

When the fluorescent lamp according to the present embodiment is used under the same applied-voltage condition as the conventional condition, a significant increase in brightness can be expected. If a brightness equivalent to that in the conventional fluorescent lamp is sufficient, the applied voltage can be reduced. Also, if a brightness equivalent to that in the conventional fluorescent lamp is sufficient, further downsizing is possible. Furthermore, a brightness equivalent or higher to the conventional brightness can be achieved even if excitation energy (discharge power) is decreased, thereby allowing a reduction in illumination cost.

Eleventh Embodiment

In an eleventh embodiment, in the lamp structure shown in FIG. 5 described above, sodium alone is enclosed in the luminous tube 41, with nanoparticles being added to the electrodes 41a and 41b. The nanoparticles (metal powder) added to the electrodes are released through electric discharge into a plasma, and then are reacted with oxygen serving as a quencher of sodium light emission, thereby increasing the intensity of sodium light emission. Dissociation energy of sodium oxide (NaO) is as low as 65 kcal/mol, and therefore easy dissociation and reaction with sodium again can be expected. However, for example, when titanium ultrafine particles are used as nanoparticles, dissociation energy of titanium oxide (TiO) is as high as 156 kcal/mol, and therefore dissociation tends not to be easily done, and oxygen tends not to act as a quencher. For this reason, sodium light emission is stabilized.

According to the present embodiment, with nanoparticles being added to the electrodes, a step of previously dispersing nanoparticles in sodium is not required, thereby allowing a reduction in manufacturing cost. With the nanoparticles being present in the electric-discharge plasma, a stable electric discharge is possible even if oxygen serving as a quencher is present. Therefore, oxygen remaining in the luminous tube and impurity oxygen in the discharge gas can be easily managed compared with the conventional lamp, thereby allowing a reduction in lamp manufacturing cost.

Twelfth Embodiment

As well known, on the inner surface of a plasma display, fluorescent substances are multi-layered according to their pattern. Near such a large number of fluorescent substances, an electric discharge is caused by application of a voltage. With this electric-discharge energy, each fluorescent substance is caused to emit fluorescence, thereby displaying information. The large number of fluorescent substances is formed by filling a plurality of electric-discharge fluorescent spaces with a fluorescent-substance complex, the spaces being formed through sectioning by many partitions formed on the inner surface of a substrate of the plasma display. In the present embodiment, in the fluorescent-substance complex, nanoparticles of 10 ppm to 100 ppm of the entire fluorescent-substance complex are dispersed.

When the plasma display (light-emitting body) according to the present embodiment is driven by discharge energy as the conventional discharge energy, the brightness on the display screen can be significantly increased. If a brightness equivalent to that in the conventional display is sufficient, the applied voltage can be reduced. Also, if a brightness equivalent to that in the conventional display is sufficient, further downsizing is possible. Furthermore, a brightness equivalent or higher to the conventional brightness can be achieved even if excitation energy (discharge power) is decreased, thereby allowing a reduction in display cost.

The particle sizes of nanoparticles used in the experiments in (First Embodiment) to (Twelfth Embodiment) are as follows. The units are nanometers. Used were nickel ultrafine particles having a particle size of 10 to 40 in (First Embodiment); titanium ultrafine particles having a particle size of 10 to 50 in (Second Embodiment); silver ultrafine particles having a particle size of 20 to 40 in (Third Embodiment); stainless-steel ultrafine particles having a particle size of 10 to 30 in (Fourth Embodiment); titanium ultrafine particles having a particle size of 10 to 50 in (Fifth Embodiment); and titanium ultrafine particles having a particle size of 10 to 50 in (Ninth Embodiment).

INDUSTRIAL APPLICABILITY

As has been described above, the light-emitting material and the light-emitting body having the light-emitting material according to the present invention allow an improvement in low excitation characteristic and an increase in brightness to be achieved only by adding a small amount of nanoparticles to a conventional light-emitting material and dispersing them. Thus, energy consumption of a light-emitting body for use in various types of illumination and a display can be significantly reduced. Furthermore, effects can be achieved including an increase in brightness, an extension in life, a reduction in size, and an increase in light emission response speed of the light-emitting body. Therefore, utilization of the present invention has profound technological and economic ripple effects throughout the industry.

The invention claimed is:

1. A light-emitting material comprising:
a light-emitting base material; and
metallic nanoparticles added thereto, wherein
the light-emitting base material is sodium,
the metallic nanoparticles are uniformly dispersed in the light-emitting base material, and
the metallic nanoparticles are selected from the group consisting of titanium ultrafine particles, silver ultrafine particles, and stainless-steel ultrafine particles.

2. The light-emitting material according to claim 1, wherein the light-emitting base material emits light through radiative transition of electrons in material atoms.

3. The light-emitting material according to claim 1, wherein the nanoparticles are dispersed in the base material as a result of the addition, thereby achieving a low-excitation and high-brightness light emission characteristic.

4. The light-emitting material according to claim 1, wherein light emission occurs through electric discharge.

5. The light-emitting material according to claim 4, wherein the electric discharge is arc discharge.

6. The light-emitting material according to claim 4, wherein the electric discharge is glow discharge.

7. The light-emitting material according to claim 1, wherein light emission occurs through any one of application of an electric field, plasma generation, ionization by heating, and light irradiation.

8. The light-emitting material according to claim 1, wherein the nanoparticles have a particle size equal to or smaller than 1,000 nanometers in diameter.

9. A light-emitting body comprising:
a light-emitting material, wherein the material comprises a light-emitting base material, and metallic nanoparticles added thereto, wherein
the light-emitting base material is sodium,
the metallic nanoparticles are uniformly dispersed in the light-emitting base material, and
the metallic nanoparticles are selected from the group consisting of titanium ultrafine particles, silver ultrafine particles, and stainless-steel ultrafine particles.

10. The light-emitting body according to claim 9, wherein the light-emitting base material emits light through radiative transition of electrons in material atoms.

11. The light-emitting body according to claim 9, wherein the nanoparticles are dispersed in the base material as a result of the addition, thereby achieving a low-excitation and high-brightness light emission characteristic.

12. The light-emitting body according to claim 9, wherein light emission occurs through electric discharge.

13. The light-emitting body according to claim 12, wherein the electric discharge is arc discharge.

14. The light-emitting body according to claim 12, wherein the electric discharge is glow discharge.

15. The light-emitting body according to claim 9, wherein light emission occurs through any one of application of an electric field, plasma generation, ionization by heating, and light irradiation.

16. The light-emitting body according to claim 9, wherein the nanoparticles have a particle size equal to or smaller than 1,000 nanometers in diameter.

17. A light-emitting method comprising:
applying predetermined excitation energy to a light-emitting material, wherein the light-emitting material comprises a light-emitting base material, and metallic nanoparticles added thereto, wherein
the light-emitting base material is sodium,
the metallic nanoparticles are uniformly dispersed in the light-emitting base material, and
the metallic nanoparticles are selected from the group consisting of nickel ultrafine particles, titanium ultrafine particles, silver ultrafine particles, and stainless-steel ultrafine particles.

18. The light-emitting method according to claim 17, wherein the light-emitting base material emits light through radiative transition of electrons in material atoms.

19. The light-emitting method according to claim 17, wherein electric discharge energy is used as the excitation energy.

20. The light-emitting method according to claim 19, wherein glow discharge energy is used as the electric discharge energy.

21. The light-emitting method according to claim 17, wherein any one of electric-field energy, plasma, ionization by heating, and irradiated light is used as the excitation energy.

22. The light-emitting method according to claim 17, wherein the nanoparticles have a particle size equal to or smaller than 1,000 nanometers in diameter.

* * * * *